United States Patent [19]

Gilpin et al.

[11] 4,033,778

[45] July 5, 1977

[54] PROCESS FOR MAKING MAGNESIA

[75] Inventors: William Cecil Gilpin, Welbeck Woodhouse, near Worksop; Noel Heasman, The Grove, near Hartlepool; John Williamson, Hart, near Hartlepool, all of England

[73] Assignee: Steetley Limited, England

[22] Filed: May 9, 1975

[21] Appl. No.: 576,208

Related U.S. Application Data

[63] Continuation of Ser. No. 308,603, Nov. 21, 1972, abandoned.

[30] Foreign Application Priority Data

Dec. 1, 1971 United Kingdom ............ 55820/71
Apr. 4, 1972 United Kingdom ............ 15482/72

[52] U.S. Cl. ................................. 106/58; 106/59; 423/636
[51] Int. Cl.² ........................................ C04B 35/04
[58] Field of Search ............... 106/58, 59; 423/636, 423/164; 264/56, 64, 66

[56] References Cited

UNITED STATES PATENTS

| 2,313,746 | 3/1943 | Heany ................................. 264/56 |
| 2,493,752 | 1/1950 | De Maestri ........................ 423/164 |
| 2,571,134 | 10/1951 | Hicks ................................. 106/59 |
| 2,823,134 | 2/1958 | Atlas ................................. 106/58 |
| 3,378,615 | 4/1968 | Zisner et al. ...................... 423/636 |
| 3,573,079 | 3/1971 | Shibasaki et al. ................. 106/58 |

FOREIGN PATENTS OR APPLICATIONS

| 1,240,466 | 7/1971 | United Kingdom |
| 1,115,386 | 5/1968 | United Kingdom ............... 423/636 |

*Primary Examiner*—J. Poer
*Attorney, Agent, or Firm*—Bacon & Thomas

[57] ABSTRACT

A process for making magnesia wherein a sludge of magnesium hydroxide is simultaneously dewatered and compacted to give a cake of magnesium hydroxide containing at least 67.5% by weight of solids and having a green bulk density of at least 1.15 grams/cc and wherein the cake thereby obtained is converted by a suitable heat treatment into magnesium oxide.

Refractory products produced from the magnesia of the invention are also described.

13 Claims, No Drawings

PROCESS FOR MAKING MAGNESIA

This application is a continuation of application Ser. No. 308,603, filed Nov. 21, 1972, now abandoned.

This invention relates to a process for making magnesia.

Magnesia for use as a refractory aggregate or in the manufacture of refractory shapes, that is, for example, bricks and blocks, is commonly made from naturally occurring magnesium bearing ores, principally magnesite, or from magnesium salts, especially when these are in the form of magnesium bearing brines or sea-water. In the production of magnesia from magnesium bearing brines and sea-water, and in the production from certain ores where the magnesium value is to be taken into solution, the magnesium value is recovered by precipitating it as the hydroxide by virtue of the low solubility of this compound in water. This is achieved by treating the magnesium bearing solution, brine or sea-water with an alkali, generally a caustic alkali and most commonly either lime or slaked lime, dolomitic lime or slaked dolomitic lime or caustic soda.

The precipitation is achieved by adding a suspension or solution of the appropriate base under controlled conditions to the magnesium bearing solution and as described, for example, in UK Patent Nos. 482,339; 482,340; 539,027; 540,139; 571,276; 615,782; and 635,781. The precipitated hydroxide is then separated by a process of sedimentation or settling whereby the settled sludge or cream of magnesium hydroxide can be separated and recovered and the used or spent brine or sea-water rejected. This sedimentation is usually carried out in large tanks known as thickeners and which are constructed and operated so that they can receive a continuous flow of suspension to be settled and can discharge separately the sludge of magnesium hydroxide to be further processed and recovered and the spent brine or sea-water to waste.

The solids content of the magnesium hydroxide sludge recovered from the thickeners generally runs at a concentration of from 150 to 400 grammes magnesium hydroxide per liter according to the conditions under which the magnesium hydroxide has been precipitated and the efficiency and mode of operation of the thickener.

In carrying out the reaction, control is effected not only for the purpose of achieving the desired physical characteristics in the precipitated hydroxide but also for the purpose of achieving the desired levels of other substances, for example, compounds of calcium, boron and sulphur. The desired levels may be the lowest levels, but are not necessarily so.

The thickened sludge is then generally further de-watered by filtration. Commonly, in producing magnesia on a large scale as generally required for refractory purposes, continuous vacuum filters of the drum, panel or disc type are used. From this de-watering a cake is obtained which has the consistency of a stiff paste and generally contains from 40% to 60% solids. It should be noted that if the reaction has been carried out skillfully and with selected raw materials to give a high purity magnesium hydroxide then the solids in the cake consist principally of magnesium hydroxide and as this magnesium compound contains some 31% of combined water then the total (combined + free) water content of the cake can be from some 72% (at 40% solids) to some 59% (at 60% solids).

In further processing the sludge of magnesium hydroxide either to caustic calcined magnesia or to dead-burnt magnesia, it is fed into appropriate furnaces or kilns, e.g. multiple hearth furnaces or rotary kilns and subjected to appropriate heat treatment. For caustic calcining an appropriate heat treatment would employ a maximum temperature of up to about 1200° C. but more usually up to about 1000° C. For dead-burning the heat treatment would be above about 1600° C., or higher even up to 2000° C.

When pastes of the usual concentration, i.e. those containing from 40% to 60% solids are subjected to such heat treatments then the resulting magnesia product is in the form of a mixture of fine granules to powder and very few of the granules would have a greater mean diameter than 6.35 mms size.

It is possible, when dead-burning such paste, to obtain granules coarser than this by the addition of fluxes and similar materials such as, for example, silica or combinations of two or more of silica, lime, iron oxide and aluminum oxide, but where it is desired to produce a dead-burnt magnesia product containing low levels of these impurities and particularly less than 2% silica, then it is extremely difficult to produce granules coarser than 6.35 mms size.

Additionally, in producing dead-burnt magnesia for refractory use, it is desired to achieve granules of maximum density, say an apparent or bulk density exceeding 3.20 g./cc. and this is again extremely difficult by direct dead-burning of cakes containing 40% to 60% solids. The reason seems to be that cakes of this kind on being dried and more particularly on being calcined form weak and friable bodies and which on being subjected to attrition (as occurs, for example, in a rotary kiln) easily break down into small granules and these granules despite their small size are difficult to burn to high density.

Refractory dead-burnt products made by direct dead-burning of 40% to 60% cakes of magnesium hydroxide produced from brines and sea-water have typically the following composition, grading and densities:

|  | A | B | C | D |
|---|---|---|---|---|
| SiO$_2$ % | 0.9 | 2.0 | 3.0 | 0.8 |
| Al$_2$O$_3$ | 0.6 | 0.6 | 0.2 | 0.5 |
| Fe$_2$O$_3$ | 1.4 | 1.4 | 0.2 | 1.4 |
| CaO | 2.0 | 2.2 | 1.0 | 0.8 |
| MgO (approx) | 94/95 | 93/94 | 94/95 | 96/97 |
| Grain Bulk Density g./cc. | 3.0 | 3.1 | 3.2 | 2.9 |
| Grading: + 6.35mms | 2% | 10% | 5% | Nil |
| + 2.41mms | 15% | 30% | 30% | 10% |
| + 1.68mms | 50% | 60% | 55% | 40% |

The problem of how to make dead-burnt magnesia of large grain size and high density from high purity magnesium hydroxide has been solved in one way by the so called "pelletising process". In this process the magnesium hydroxide is first caustic calcined to a chemically reactive oxide generally in a multiple hearth furnace, the oxide is then briquetted in high pressure briquette rolls and the briquettes are then dead-burnt, generally in rotary kilns or special gas fired shaft kilns. Clearly, the double burning with intermediate briquetting makes this a costly process even though it yields a product of good size and having perhaps 50% retained on a 6.35 mms sieve and giving an apparent or bulk density of 3.3 g./cc. to 3.4 g./cc.

We have now surprisingly discovered that if magnesium hydroxide sludges of the kind described are dewatered, usually under high pressures of greater than 400 lbs./sq.in. for example up to 20,000 lb/sq.in, to give a cake containing not less than 67.5% solids then these cakes have a remarkable property not only of being tough and strong in themselves, but of giving tough and strong bodies on drying and calcining and which are resistant to attrition and abrasion. Arising from this discovery we have further discovered that such magnesium hydroxide cakes containing a minimum of 67.5% solids can be directly calcined or dead-burnt, usually in a rotary kiln, to give a lumpy dead-burnt magnesite having a substantial proportion of granules larger than 6.35 mms. diameter.

A further surprising feature is that the 67.5% mimimum magnesium hydroxide cakes on being subjected to a given dead-burning treatment yield a product of substantially higher density than 40% to 60% solids cake normally employed. Thus, by this discovery it has been found possible to produce the equivalent of a so called pelletised dead-burnt magnesia in a single burning operation and with no briquetting thereby effecting a large reduction in cost of production.

Moreover, we have found that the magnesia made by this method has a lower boron content than conventionally filtered magnesia.

According to the present invention there is provided a process for making magnesia wherein a sludge of magnesium hydroxide, containing for example from 150 grammes to 400 grammes of magnesium hydroxide per liter, is simultaneously dewatered and compacted to give a cake of magnesium hydroxide containing at least 67.5% by weight of solids and having a green bulk density of at least 1.15 grams/cc and wherein the cake thereby obtained is converted by a suitable heat treatment into magnesium oxide.

The sludge of magnesium hydroxide may be derived from a number of sources. For instance the sludge may be obtained by treating solutions containing magnesium ions, for example, brines, sea water and the like, with alkali and separating the precipitate of magnesium hydroxide, for example, by settling. The sludge may also be obtained by treating minerals containing magnesium with acid, such as hydrochloric acid, and precipitating magnesium hydroxide from the solution which results from such a treatment. As another alternative, the magnesium hydroxide sludge may be obtained by thermal decomposition of magnesium chloride to magnesium oxide, the oxide then being converted to the hydroxide which in turn may be pressure filtered according to the process of the present invention.

Preferably the sludge of magnesium hydroxide is dewatered under conditions which involve the application of pressures greater than 400 pounds per square inch, for example up to 10,000 pounds per square inch. Desirably the pressure exerted during dewatering is in the range 750 to 7,500 pounds per square inch.

One method of simultaneously dewatering and compacting involves feeding the sludge to a filter and applying thereto a pressure preferably greater than 400 pounds per square inch. A suitable apparatus for doing this uses a cylindrical filter cloth around a hollow cylindrical supporting perforated core, pressure being applied hydraulically to the material being filtered usually via a flexible sleeve which surrounds it. Examples of this type of filtration apparatus are described in British Patent Specifications Nos. 907485 and 1,240,466. A thicker cake, advantageous when the magnesia is to be used in brick making, may be obtained by filtering using this method in two stages, the first stage involving filtration at relatively low pressures, for example 400 psi to 1,000 psi, and the second stage involving addition of a further quantity of sludge to the filter cake obtained in stage 1 followed by filtration of the mixture of sludge and cake at relatively high pressures, for example, greater than 1,000 psi.

Another method of simultaneously dewatering and compacting involves feeding the sludge to a perforated mould lined with a filter cloth and applying pressure to the sludge via a piston adapted to slide within the mould whereby there is obtained a moulded block of magnesium hydroxide which can be cut into suitably sized pieces if desired.

The dewatering and compacting may be carried out at temperatures above ambient, for example, at temperatures in the range 25° C to 100° C. It may also be desirable for a surface active agent to be incorporated in the sludge before the operation of dewatering and compacting is carried out.

The cake of magnesium hydroxide, preferably having a green bulk density greater than 1.20 grams per cubic centimeter, is converted into magnesium oxide by a suitable heat treatment. The heat treatment may be such as to give an active or caustic magneisa by calcining to a maximum temperature of up to about 1200° C but more usually up to 1000° C., for example in a multiple hearth furnace. The heat treatment may also be such as to give a dead burnt magnesia by heating to temperatures above 1600° C., even up to 2,000° C e.g. in a rotary kiln. Before dead burning the cake may be pelletised and, in this instance, it is advantageous to pelletise a cake which contains at least 74%, preferably from 80 to 95%, by weight of solids. Such a solids content can be achieved either by dewatering at a pressure greater than 2,000 pounds per square inch or by dewatering at a pressure between 400 or 750 pounds per square inch and 2,000 pounds per square inch and then partially drying the material which has been dewatered under pressure, the drying preferably to a water content of from 5 to 20% by weight, being effected for example by heat.

If the filter cake is pelletised before being dead-burned, it is desirable to break down the filter cake into granules before pelletisation, this break down or "kibbling" being achieved for example by means of a disintegrator. The granules are then pelletised or briquetted using high pressure rolls capable of applying pressure at a rate of from 10 tons per square inch to 30 tons per square inch.

For refractory purposes, it is often necessary to form dead-burnt magnesia compositions which contain other refractory compounds in addition to magnesia. It has surprisingly been found that, if these compounds or precursors thereof are mixed with the sludge of magnesium hydroxide in the present process there is obtained a dead-burnt magnesia composition having properties superior to similar compositions obtained by conventional methods. For instance if finely divided chrome ore is added in this way a product of excellent density is obtained.

Accordingly the present invention also provides a process wherein there is mixed with the sludge of magnesium hydroxide a finely divided refractory compound or a precursor therefor.

Suitable refractory compounds or precursors therefor include lime-bearing materials, chrome-bearing materials, zircon, zirconia and zirconium salts, silica, iron oxide ($Fe_2O_3$) and alumina. The lime-bearing materials may be dolomite, limestone and other calcium carbonate-containing materials or such materials after they have undergone calcination to decompose the carbonate, for example by calcination at temperatures in the range 800° C. to 1300° C. Suitably the calcined lime-bearing material may be hydrated. Desirably the chrome-bearing material is chrome ore having a silica content of less than 2.5% by weight or alternatively may be chromium sesquioxide ($Cr_2O_3$) which may be employed, for example, in an amount of from 0.1 to 0.5% by weight. Suitable zirconium salts include zirconium carbonate, zirconium hydroxide, zirconium sulphate and zirconium nitrate.

The proportion of refractory compound which is mixed with the magnesium hydroxide sludge depends on the nature of the refractory compound and the type of product required. In the case of lime-bearing materials, the proportion of lime or dead burnt dolomite is such that the amount of magnesia in the dead-burnt product is 40% to 95% or 55% to 85% by weight. In the case of chrome-bearing materials the production of chrome ore may be in the range 2 to 50% by weight based on the weight of MgO in the magnesium hydroxide sludge. In the case of zirconium-containing materials the proportion should be such as to form calcium zirconate with the lime in the magnesia, for example, providing 0.2 to 5% by weight of zirconia in the dead-burnt magnesia.

In order to carry out mixing effectively, it is desirable that the particle size of the unhydrated refractory material is appropriately small e.g. such that 100% passes through a 72 B.S.S. mesh and preferably such that 50% to 80% passes through a 200 B.S.S. mesh.

The actual mixing step may be carried out in any form of apparatus designed to homogenise liquid/solid components such as high shear mixers, pan mixers, pug mills and ball mills. If the refractory material is not of the desired small size the necessary size reduction may be carried out during mixing by using a mill-type mixer.

In making certain refractory compositions based on magnesia and chrome, it is necessary to use some chrome ore having a comparatively large particle size. In these circumstances it may be desirable to mix the large particle size material with the filter cake obtained in the present process, a possible method of mixing being to briquette the two materials together. Accordingly the present invention further provides a process wherein finely divided chrome ore, known as chrome flour, is mixed with the sludge of magnesium hydroxide and chrome ore of comparatively large particle size, e.g. of diameter between 0.21 mms and 3.18 mms., is mixed with the filter cake.

Although the boron content of the magnesia obtained by the present process is unexpectedly low, this can be lowered even further by incorporating sodium carbonate or the like (see British Patent No. 1,115,386) in the sludge or the cake before dead-burning. Remarkably the density of this resulting magnesia is not lowered to the extent that would be anticipated.

It is to be understood that the present invention also includes caustic and dead-burnt magnesia whenever produced by the process of the invention and refractory aggregates and refractory shapes, for example, bricks and blocks, when made from such dead-burnt magnesia. In yet another aspect the invention also includes a furnace wall or lining whenever constructed wholly or partly from the refractory shapes of the invention.

The invention will now be more particularly described and illustrated in the following Examples.

EXAMPLE 1

In accordance with the process of the present invention sludges of a variety of magnesium hydroxides produced from hydrated lime and sea-water and containing 300 grammes hydroxide per liter were respectively subjected to pressure filtration using an ECLP Alfa Laval tube press at a temperature of 1,500 lbs./sq.in. The resulting cakes had magnesium hydroxide contents of 75% and yielded, on test drying, dried hydroxide of acceptable density. The cakes which were in the form of irregular pieces of some 50.8 mms length by 25.4 mms breadth by 12.7 mms thickness were dead-burnt by feeding directly into a furnace fired to give a heat treatment equivalent to 1 hour at 1800° C. During the firing very little breakdown of the cakes occurred. The chemical analysis, bulk density and particle size grading of the respective products are summarized in the following Table wherein oxide contents are expressed as percentages by weight:

| | | | | | | |
|---|---|---|---|---|---|---|
| Silica ($SiO_2$) | 1.0 | 0.8 | 2.0 | 0.9 | 0.6 | 0.8 |
| Alumina ($Al_2O_3$) | 0.5 | 0.4 | 0.6 | 0.5 | 0.2 | 0.2 |
| Iron oxide ($Fe_2O_3$) | 1.5 | 1.3 | 1.3 | 5.0 | 0.2 | 0.2 |
| Lime (Ca O) | 1.0 | 1.6 | 2.2 | 1.7 | 0.6 | 1.6 |
| $Cr_2O_3$ | — | 0.3 | — | — | — | 0.3 |
| $B_2O_3$ | 0.07(0.14) | 0.03 | 0.15(0.2) | 0.09(0.2) | 0.1(0.2) | 0.03(0.03) |
| Mg O | 96 | 95.6 | 93.7 | 91.7 | 98.2 | 96.9 |
| Bulk density (g/cc) | 3.3(2.9) | 3.3 | 3.2(3.0) | 3.2(3.1) | 3.35(3.35) | 3.43(3.3) |
| Grading | 60% + mms. <1% − 0.5 mms (5% + 6.35mms) | 60% + 5 mms 1% − 0.5mms | 65%(50%) + 1.5 mms 1%(10%) − 0.5mms | 80%(50%) + 1.5 mms 5%(15%) − 0.5mms | 60%(50%) + 4 mms 1%(15%) − 0.5mms | 60%(50%) + mms 1%(15%) − 0.5mms |

Figures in parentheses refer to corresponding data for similar sludges subjected to conventional filtration.

EXAMPLE 2

In a further development of the process described in Example 1 the high pressure filtered paste was broken down to granules or kibbled by means of a disintegrator and the granules semi-dried to give a solids content of 87%. The semi-dried granules were then briquetted using high pressure (462 $MN/m^2$) briquette rolls. The resulting briquettes were extremely strong and on test drying yielded a dried hydroxide of density 1.75./cc. On firing the briquettes directly in a furnace, that is, without drying, a product of the preceding analysis and density 3.38 g./cc. was obtained. Again this process, although introducing a briquetting stage is much less costly than the caustic calcining — briquetting — dead-burning process, because it eliminates the calcining step.

EXAMPLE 3

10 parts by weight of a magnesium hydroxide sludge obtained from sea-water by precipitation settling and washing was wet blended with 5.46 parts by weight of chrome flour.

The magnesium hydroxide sludge had the following analysis:

| Magnesium hydroxide | 280 grams/litre |
|---|---|
| Silica ($SiO_2$) | 1.3 grams/litre |
| Alumina ($Al_2O_3$) | 0.7 grams/litre |
| Iron Oxide ($Fe_2O_3$) | 2.6 grams/litre |
| Lime (CaO) | 1.8 grams/litre |
| Free water | 890 grams/litre |

The chrome flour had a particle size such that at least 90% passed through a 300 B.S.S. mesh and was obtained from a chrome ore analysing as follows:

| $Cr_2O_3$ | 45.7% |
|---|---|
| $Fe_2O_3$ | 25.6% |
| $SiO_2$ | 1.2% |
| $Al_2O_3$ | 16.6% |
| MgO | 10.9% |

The mixture was subjected to pressure filtration using an ECLP Alfa Laval tube press at a pressure of 1,500 lbs/square inch. The resulting filter cake was about 12.7 mms thick and 25.4 mms to 50.8 mms in length and breadth. This was mixed with 2.71 parts by weight of coarse chrome having a particle size such that 100% passed through a 8 B.S.S. mesh and having the same chemical analysis as the chrome flour. The mixture was fired at 1800° C. for 2 hours and gave a product having a density of 3.55 and a grading of 60% + 4 mms and 1% − 0.5 mms.

EXAMPLE 4

9 parts by weight of magnesium hydroxide sludge having the analysis of the sludge given in Example 3 was wet blended with 1 part by weight of chrome ore having the analysis of the chrome ore given in Example 3. The particle size of the chrome ore was as follows:

| Size (B.S.S. mesh) | | % |
|---|---|---|
| | + 30 | 0 |
| −30 | + 72 | 0.9 |
| −72 | + 100 | 2.5 |
| −100 | + 200 | 27.1 |
| −200 | + 300 | 16.1 |
| | − 300 | 53.4 |

The mixture was subjected to pressure filtration using an ECLP Alfa Laval tube press at a pressure of 1,500 lbs./square inch and the resulting filter cake was fired at 1800° C. for 2 hours to give a product having a density of 3.41.

EXAMPLE 5

Magnesium hydroxide sludge containing 30.6 parts by weight of $Mg(OH)_2$ and having the following analysis:

| Magnesium hydroxide | 295 grams/litre |
|---|---|
| Silica ($SiO_2$) | 1.4 grams/litre |
| Alumina ($Al_2O_3$) | 0.8 grams/litre |
| Iron Oxide ($Fe_2O_3$) | 2.5 grams/litre |
| Lime (CaO) | 1.6 grams/litre |
| Free water | 875 grams/litre | was wet blended with 35 parts by weight of hydrated calcined dolomite. Both the magnesium hydroxide and the dolime had a particle size such that 100% passed through a 300 B.S.S. mesh. The mixture was subjected to pressure filtration using an ECLP Alfa Laval tube press at a pressure of 1,500 lbs./square inch and the resulting filter cake was fired at 1500° C. for 1 hour. The resulting material had a bulk density of 3.36 grams/cc.

EXAMPLE 6

A magnesium hydroxide slurry was filtered at various pressures and the filter cake obtained was dead-burned at 1800° C. The magnesium hydroxide had the following loss free analysis:

| MgO | 96.9% by weight |
|---|---|
| $SiO_2$ | 0.45 |
| $Al_2O_3$ | 0.2 |
| $Fe_2O_3$ | 0.2 |
| CaO | 1.6 |
| $B_2O_3$ | 0.1 |

The following Table shows the effect of the above operation on free water content of the cake (column 1), green bulk density (column 2), fired bulk density (column 3) and boron content (column 4).

| Pressure (psi) | 1 wt% | 2 g/cm³ | 3 g/cm³ | 4 wt% |
|---|---|---|---|---|
| 10 | 50 | — | 2.95 | 0.05 |
| 500 | 31 | 1.16 | 3.28 | 0.035 |
| 1,000 | 26.5 | 1.28 | 3.33 | 0.038 |
| 2,000 | 26.0 | 1.34 | 3.35 | 0.032 |
| 3,000 | 23.0 | 1.39 | 3.37 | 0.028 |
| 4,000 | 22.0 | 1.44 | 3.40 | 0.035 |

The data in the above Table for the process operated at a pressure of 10 psi are presented for comparison purposes only.

EXAMPLE 7

Magnesium hydroxide sludge was filtered at various pressures and the filter cake obtained was dead-burned at 1800° C. The magnesium hydroxide had the following analysis on a less free basis:

| MgO | 95.7% |
|---|---|
| Silica | 1.0% |
| Alumina | 0.5% |
| $Fe_2O_3$ | 1.4% |
| lime | 0.9% |

Details of the filtration and the results obtained are as follows:

| Pressure (psi) | Free water Content (%) | Green Bulk Density (g/cc) | Fired Bulk Density (g/cc) |
| --- | --- | --- | --- |
| 1000 | 27.5 | 1.24 | 3.26 |
| 2000 | 26.0 | 1.31 | 3.28 |
| 4000 | 22.6 | 1.42 | 3.31 |
| 6000 | 21.2 | 1.44 | 3.34 |
| 10,000 | 19.4 | 1.54 | 3.36 |
| 20,000 | 17.0 | 1.62 | 3.39 |

We claim:

1. In a process for producing a refractory material in which an aqueous suspension of magnesium hydroxide is dewatered and the dewatered solid thus obtained is calcined to form the desired refractory, the improvement which comprises dewatering the aqueous suspension of the magnesium hydroxide at a pressure which is greater than 400 lbs per square inch to give a cake of magnesium hydroxide containing at least 67.5% by weight of solids and having a green bulk density of at least 1.15 grams/cc.

2. A process according to claim 1 wherein the aqueous suspension of magnesium hydroxide is a sluge containing from 150 grams to 400 grams of magnesium hydroxide per liter.

3. A process according to claim 2 wherein the magnesium hydroxide sludge is simultaneously dewatered and compacted by the application of pressures in the range from 400 to 10,000 pounds per square inch.

4. A process according to claim 3 wherein dewatering and compacting are effected by feeding the magnesium hydroxide sludge to a filter and applying pressure thereto.

5. A process according to claim 4 wherein dewatering and compacting are effected by feeding the sludge to a perforated mould lined with a filter cloth and applying pressure to the sludge via a piston adapted to slide within the mould.

6. A process according to claim 1 wherein the magnesium hydroxide cake is calcined to a maximum temperature of about 1200° C to yield an active or caustic magnesia.

7. A process according to claim 1 wherein the magnesium hydroxide cake is dead burned by heating to a temperature above 1600° C.

8. A process according to claim 7 wherein the cake is pelletized prior to dead burning.

9. A process according to claim 8 wherein the cake is dewatered and compacted to a solids content of at least 74% by weight prior to pelletizing.

10. A process according to claim 9 wherein dewatering and compacting is carried out at a pressure between 400 to 2000 pounds per square inch, and the cake is subsequently partially dried prior to pelletizing.

11. A process according to claim 1 wherein a finely divided refractory compound is added to the magnesium hydroxide to be dewatered.

12. A process according to claim 1 wherein a finely divided material which will form refractory material during the calcining operation is added to the magnesium hydroxide to be dewatered.

13. A process according to claim 1 wherein finely divided chrome ore, known as chrome flour, is mixed with the suspension of magnesium hydroxide and chrome ore of larger particle size is mixed with the filter cake.

* * * * *